United States Patent
Robinson

(10) Patent No.: US 11,258,487 B2
(45) Date of Patent: *Feb. 22, 2022

(54) COMMUNICATION SYSTEM AND METHOD FOR ACHIEVING HIGH DATA RATES USING MODIFIED NEARLY-EQUIANGULAR TIGHT FRAME (NETF) MATRICES

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,175

(22) Filed: Jun. 23, 2020

(65) Prior Publication Data
US 2021/0067211 A1  Mar. 4, 2021

Related U.S. Application Data

(63) Continuation of application No. 16/560,447, filed on Sep. 4, 2019, now Pat. No. 10,735,062.

(51) Int. Cl.
  *H04L 1/02* (2006.01)
  *H04B 7/0456* (2017.01)
  (Continued)

(52) U.S. Cl.
  CPC .......... *H04B 7/0456* (2013.01); *G06F 7/556* (2013.01); *H04L 5/0007* (2013.01)

(58) Field of Classification Search
  CPC ...... H04B 7/0456; G06F 7/556; H04L 5/0007
  (Continued)

(56) References Cited

U.S. PATENT DOCUMENTS 5,237,587 A   8/1993   Schoolcraft
5,345,599 A   9/1994   Paulraj et al.
(Continued)

FOREIGN PATENT DOCUMENTS

CN   1813435 A   8/2006
CN   101179539 A   5/2008
(Continued)

OTHER PUBLICATIONS

International Search Report and Written Opinion for PCT Application No. PCT/US2017/061489, dated Feb. 26, 2018, 8 pages.
(Continued)

*Primary Examiner* — Helene E Tayong
(74) *Attorney, Agent, or Firm* — Cooley LLP

(57) ABSTRACT

A method includes generating a set of symbols based on an incoming data vector. The set of symbols includes K symbols, K being a positive integer. A first transformation matrix including an equiangular tight frame (ETF) transformation or a nearly equiangular tight frame (NETF) transformation is generated, having dimensions N×K, where N is a positive integer and has a value less than K. A second transformation matrix having dimensions K×K is generated based on the first transformation matrix. A third transformation matrix having dimensions K×K is generated by performing a series of unitary transformations on the second transformation matrix. A first data vector is transformed into a second data vector having a length N based on the third transformation matrix and the set of symbols. A signal representing the second data vector is sent to a transmitter for transmission of a signal representing the second data vector to a receiver.

20 Claims, 9 Drawing Sheets

(51) Int. Cl.
  *G06F 7/556* (2006.01)
  *H04L 5/00* (2006.01)
(58) Field of Classification Search
  USPC .......................................................... 375/267
  See application file for complete search history.

(56) References Cited

U.S. PATENT DOCUMENTS

| | | |
|---|---|---|
| 5,555,268 A | 9/1996 | Fattouche et al. |
| 6,389,138 B1 | 5/2002 | Li et al. |
| 7,376,173 B2 | 5/2008 | Yedidia et al. |
| 7,454,084 B2 | 11/2008 | Faber et al. |
| 8,737,509 B2 | 5/2014 | Yu et al. |
| 9,648,444 B2 | 5/2017 | Agee |
| 10,020,839 B2 | 7/2018 | Robinson et al. |
| 10,491,262 B2 | 11/2019 | Robinson et al. |
| 10,637,705 B1 | 4/2020 | Shattil |
| 10,735,062 B1 | 8/2020 | Robinson |
| 10,771,128 B1 | 9/2020 | Sitaram et al. |
| 10,819,387 B2 | 10/2020 | Robinson et al. |
| 10,833,749 B1 | 11/2020 | Robinson |
| 10,873,361 B2 | 12/2020 | Robinson |
| 10,917,148 B2 | 2/2021 | Robinson |
| 10,965,352 B1 | 3/2021 | Robinson |
| 11,018,715 B2 | 5/2021 | Robinson et al. |
| 11,025,470 B2 | 6/2021 | Robinson |
| 11,050,604 B2 | 6/2021 | Robinson |
| 2002/0009209 A1 | 1/2002 | Inoue et al. |
| 2003/0185309 A1 | 10/2003 | Pautler et al. |
| 2003/0210750 A1 | 11/2003 | Onggosanusi et al. |
| 2004/0059547 A1 | 3/2004 | Aftelak |
| 2004/0105489 A1 | 6/2004 | Kim et al. |
| 2004/0253986 A1 | 12/2004 | Hochwald et al. |
| 2006/0109897 A1 | 5/2006 | Guo et al. |
| 2006/0274825 A1 | 12/2006 | Cioffi et al. |
| 2007/0091999 A1 | 4/2007 | Nissan-Cohen et al. |
| 2007/0098063 A1 | 5/2007 | Reznic et al. |
| 2007/0115797 A1 | 5/2007 | Reznic et al. |
| 2007/0281746 A1 | 12/2007 | Takano et al. |
| 2009/0046801 A1 | 2/2009 | Pan et al. |
| 2009/0316802 A1 | 12/2009 | Tong et al. |
| 2010/0119001 A1 | 5/2010 | Walton et al. |
| 2010/0150266 A1 | 6/2010 | Mondal et al. |
| 2010/0202553 A1 | 8/2010 | Kotecha et al. |
| 2010/0246656 A1 | 9/2010 | Hammerschmidt |
| 2010/0329393 A1 | 12/2010 | Higuchi |
| 2011/0134902 A1 | 6/2011 | Ko et al. |
| 2011/0235728 A1 | 9/2011 | Karabinis |
| 2012/0093090 A1 | 4/2012 | Han et al. |
| 2012/0236817 A1 | 9/2012 | Chen et al. |
| 2012/0257664 A1 | 10/2012 | Yue et al. |
| 2012/0307937 A1 | 12/2012 | Higuchi |
| 2013/0064315 A1 | 3/2013 | Heath, Jr. et al. |
| 2013/0100965 A1 | 4/2013 | Ohmi et al. |
| 2013/0223548 A1 | 8/2013 | Kang et al. |
| 2014/0056332 A1 | 2/2014 | Soualle et al. |
| 2015/0003500 A1 | 1/2015 | Kesling et al. |
| 2015/0049713 A1 | 2/2015 | Lan et al. |
| 2015/0171982 A1 | 6/2015 | Wang et al. |
| 2015/0304130 A1 | 10/2015 | Logothetis et al. |
| 2016/0309396 A1 | 10/2016 | Chai et al. |
| 2016/0337156 A1 | 11/2016 | Milleth et al. |
| 2017/0180020 A1 | 6/2017 | Namgoong et al. |
| 2017/0237545 A1 | 8/2017 | Khandani |
| 2017/0288902 A1 | 10/2017 | Rusek et al. |
| 2017/0294946 A1 | 10/2017 | Wang et al. |
| 2017/0302415 A1 | 10/2017 | Park et al. |
| 2017/0331539 A1 | 11/2017 | Pham et al. |
| 2019/0075091 A1 | 3/2019 | Shattil et al. |
| 2019/0097694 A1 | 3/2019 | Jeon et al. |
| 2019/0115960 A1 | 4/2019 | Jiang et al. |
| 2019/0158206 A1 | 5/2019 | Li et al. |
| 2019/0215222 A1 | 7/2019 | Cheng et al. |
| 2019/0260444 A1 | 8/2019 | Hauzner et al. |
| 2019/0268035 A1 | 8/2019 | Robinson et al. |
| 2019/0280719 A1 | 9/2019 | Yu |
| 2019/0349042 A1 | 11/2019 | Ramireddy et al. |
| 2019/0349045 A1 | 11/2019 | Varatharaajan et al. |
| 2019/0379430 A1 | 12/2019 | Pekoz et al. |
| 2020/0007204 A1 | 1/2020 | Jeon et al. |
| 2020/0014407 A1 | 1/2020 | Smith et al. |
| 2020/0366333 A1 | 11/2020 | Robinson |
| 2021/0006288 A1 | 1/2021 | Robinson et al. |
| 2021/0006303 A1 | 1/2021 | Robinson |
| 2021/0006317 A1 | 1/2021 | Robinson |
| 2021/0006446 A1 | 1/2021 | Robinson |
| 2021/0006451 A1 | 1/2021 | Robinson |
| 2021/0036901 A1 | 2/2021 | Robinson |
| 2021/0159950 A1 | 5/2021 | Robinson |
| 2021/0184899 A1 | 6/2021 | Robinson |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| JP | 2003-198500 A | 7/2003 |
| JP | 2013-162293 A | 8/2013 |
| KR | 10-2010-0131373 A | 12/2010 |
| KR | 10-2013-0118525 A | 10/2013 |
| WO | WO 2006/025382 A1 | 3/2006 |
| WO | WO 2008/024773 A2 | 2/2008 |
| WO | WO 2008/098225 A2 | 8/2008 |

OTHER PUBLICATIONS

Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.

Ericsson, "Signature design for NoMA," 3GPP TSG-RAN WG1 Meeting #93, Tdoc R1-1806241, Busan, South Korea, May 21-25, 2018, pp. 1-5.

International Search Report and Written Opinion for International Application No. PCT/US2020/039879, dated Oct. 9, 2020, 10 pages.

International Search Report and Written Opinion for International Application No. PCT/US2020/039606, dated Nov. 25, 2020, 18 pages.

International Search Report and Written Opinion for International Application No. PCT/US2020/043686, dated Dec. 3, 2020, 24 pages.

Invitation to Pay Additional Fees for International Application No. PCT/US2020/039606 dated Sep. 21, 2020, 12 pages.

Invitation to Pay Additional Fees for International Application No. PCT/US2020/043686 dated Oct. 7, 2020, 16 pages.

Invitation to Pay Additional Fees for International Application No. PCT/US2020/049031 dated Nov. 11, 2020, 13 pages.

Ma et al., "Secure Communication in TDS-OFDM System Using Constellation Rotation and Noise Insertion," IEEE Transactions on Consumer Electronics, Aug. 2010, vol. 56, No. 3, pp. 1328-1332.

Non-Final Office Action for U.S. Appl. No. 16/459,254 dated Nov. 5, 2020, 9 pages.

Huang et al., "Multi-dimensional encryption scheme based on physical layer for fading channel," IET Communications, Oct. 2018, vol. 12, Issue 19, pp. 2470-2477.

Huo and Gong, "A New Efficient Physical Layer OFDM Encryption Scheme," IEEE INFOCOM 2014, IEEE Conference on Computer Communications, pp. 1024-1032.

International Search Report and Written Opinion for International Application No. PCT/US2020/040393, dated Sep. 3, 2020, 12 pages.

Liu et al., "Piecewise Chaotic Permutation Method for Physical Layer Security in OFDM-PON," IEEE Photonics Technology Letters, Nov. 2016, vol. 28, No. 21, pp. 2359-2362.

(56) References Cited

OTHER PUBLICATIONS

Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.
International Search Report and Written Opinion for International Application No. PCT/US2020/051927, dated Jan. 15, 2021, 19 pages.
International Search Report and Written Opinion for International Application No. PCT/US2020/049031, dated Jan. 18, 2021, 20 pages.
International Search Report and Written Opinion for International Application No. PCT/US2021/017043, dated May 14, 2021, 12 pages.
Sung et al., "M-PSK Codebook Based Clustered MIMO-OFDM SDMA with Efficient Codebook Search," IEEE, 2012, 5 pages.
Tseng et al., "Hardware Implementation of the Joint Precoding Sub-System and MIMO Detection Preprocessor in IEEE 802.11n/ac WLAN," Journal of Signal Processing Systems (2019) 91:875-884.
Xie et al., "Geometric Mean Decomposition Based Hybrid Precoding for Millimeter-Wave Massive MIMO," China Communications, May 2018, vol. 15, Issue 5, pp. 229-238.
Zhang et al., "A Novel Precoder Design for MIMO Multicasting with MMSE-DFE Receivers," IEEE, 2014, 5 pages.
Zheng et al., "Performance Comparison on the Different Codebook for SU/MU MIMO," IEEE 802.16 Broadband Wireless Access Working Group, IEEE 0802.16m-08/1183r1, Sep. 12, 2008, pp. 1-9.
Strohmer et al., "Grassmannian frames with applications to coding and communication," Appl. Comput. Harmon. Anal. (2003)14: 257-275.
Tsiligianni et al., "Construction of Incoherent Unit Norm Tight Frames With Application to Compressed Sensing," IEEE Transactions on Information Theory, Apr. 2014, vol. 60, No. 4. pp. 2319-2330.

200B

```
┌─────────────────────────────────────────────────┐
│ Generate a set of symbols based on an incoming data │
│ vector, the set of symbols including K symbols, where K is │
│           a positive integer 210                │
└─────────────────────────────────────────────────┘
                        ↓
┌─────────────────────────────────────────────────┐
│ Apply a nonlinear transformation to the set of symbols to │
│      produce a set of transformed symbols 211   │
└─────────────────────────────────────────────────┘
                        ↓
┌─────────────────────────────────────────────────┐
│ Generate a first transformation matrix, of dimensions N x │
│    K, where N is a positive integer and less than K 212 │
└─────────────────────────────────────────────────┘
                        ↓
┌─────────────────────────────────────────────────┐
│ Generate a second transformation matrix, of dimensions K │
│    x K, based on the first transformation matrix 214 │
└─────────────────────────────────────────────────┘
                        ↓
┌─────────────────────────────────────────────────┐
│ Generate a third transformation matrix, of dimensions K x │
│ K, by performing a series of unitary transformations on the │
│         second transformation matrix 216        │
└─────────────────────────────────────────────────┘
                        ↓
┌─────────────────────────────────────────────────┐
│ Transform a first data vector into a second data vector, of │
│ length N, based on the third transformation matrix and the │
│          set of transformed symbols 218         │
└─────────────────────────────────────────────────┘
                        ↓
┌─────────────────────────────────────────────────┐
│ Apply a fast unitary transformation to the second data │
│       vector to produce a third data vector 219 │
└─────────────────────────────────────────────────┘
                        ↓
┌─────────────────────────────────────────────────┐
│ Send a signal representing the third data vector to a │
│ transmitter for transmission of a signal representing the │
│ third data vector from the transmitter to a receiver 220 │
└─────────────────────────────────────────────────┘
```

FIG. 2B

COMMUNICATION SYSTEM AND METHOD FOR ACHIEVING HIGH DATA RATES USING MODIFIED NEARLY-EQUIANGULAR TIGHT FRAME (NETF) MATRICES

CROSS-REFERENCE TO RELATED APPLICATIONS

This application is a continuation of U.S. patent application Ser. No. 16/560,447, filed Sep. 4, 2019, and titled "Communication System and Method for Achieving High Data Rates Using Modified Nearly-Equiangular Tight Frame (NETF) Matrices," the disclosure of which is incorporated by reference herein in its entirety for all purposes.

This application is related to U.S. Pat. No. 10,020,839, issued on Jul. 10, 2018 and titled "RELIABLE ORTHOGONAL SPREADING CODES IN WIRELESS COMMUNICATIONS;" to U.S. patent application Ser. No. 16/459,262, filed on Jul. 1, 2019 and titled "COMMUNICATION SYSTEM AND METHOD USING LAYERED CONSTRUCTION OF ARBITRARY UNITARY MATRICES;" to U.S. patent application Ser. No. 16/459,245, filed on Jul. 1, 2019 and titled "Systems, Methods and Apparatus for Secure and Efficient Wireless Communication of Signals using a Generalized Approach within Unitary Braid Division Multiplexing;" and to U.S. patent application Ser. No. 16/459,254, filed on Jul. 1, 2019 and titled "Communication System and Method using Orthogonal Frequency Division Multiplexing (OFDM) with Non-Linear Transformation;" the disclosures of each of which are incorporated by reference herein in their entireties for all purposes.

STATEMENT REGARDING FEDERAL GOVERNMENT INTEREST

This United States Government holds a nonexclusive, irrevocable, royalty-free license in the invention with power to grant licenses for all United States Government purposes.

TECHNICAL FIELD

This description relates to systems and methods for transmitting wireless signals for electronic communications and, in particular, to increasing the data rate of, and reducing the computational complexity of, wireless communications.

BACKGROUND

In multiple access communications, multiple user devices transmit signals over a given communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital-to-analog converter, and then translated up to the carrier frequency for transmission. When different user devices send symbols at the same time over the communications channel, the sine waves represented by those symbols are superimposed to form a combined signal that is received at the receiver.

SUMMARY

A method for achieving high data rates includes generating a set of symbols based on an incoming data vector. The set of symbols includes K symbols, K being a positive integer. A first transformation matrix including an equiangular tight frame (ETF) transformation or a nearly equiangular tight frame (NETF) transformation is generated, having dimensions N×K, where N is a positive integer and has a value less than K. A second transformation matrix having dimensions K×K is generated based on the first transformation matrix. A third transformation matrix having dimensions K×K is generated by performing a series of unitary transformations on the second transformation matrix. A first data vector is transformed into a second data vector having a length N based on the third transformation matrix and the set of symbols. A signal representing the second data vector is sent to a transmitter for transmission of a signal representing the second data vector to a receiver.

The details of one or more implementations are set forth in the accompanying drawings and the description below. Other features will be apparent from the description and drawings, and from the claims.

BRIEF DESCRIPTION OF THE DRAWINGS

FIG. 2B is a flowchart illustrating an alternative implementation of the first example method for generating and transmitting transformed symbols.

DETAILED DESCRIPTION

Figure 1:
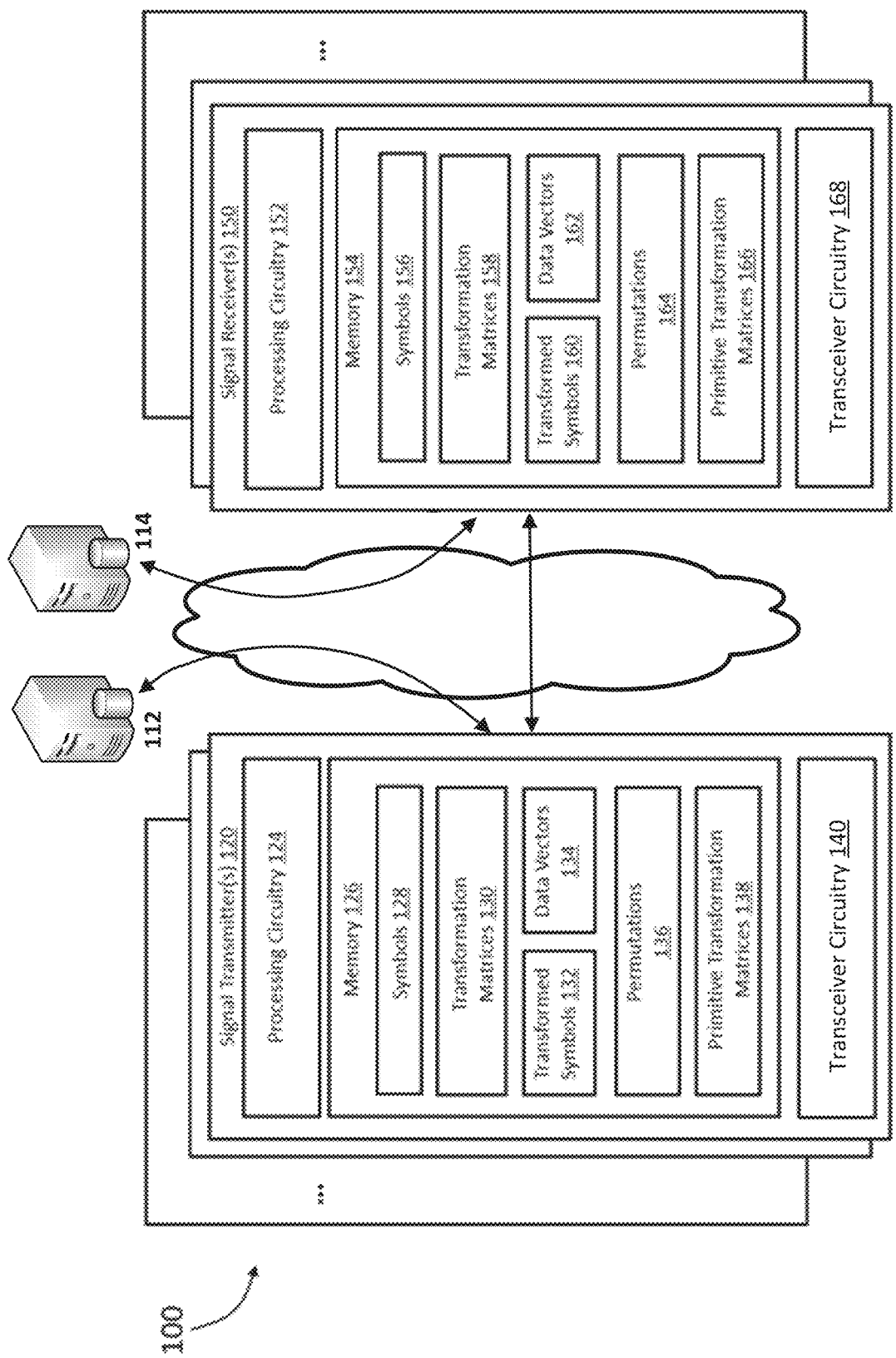
FIG. 1 is a block diagram illustrating an example electronic communications system, according to an embodiment.

Some known approaches to wireless signal communication include orthogonal frequency-division multiplexing (OFDM), which is a method of encoding digital data on multiple carrier frequencies. OFDM methods have been adapted to permit signal communications that cope with conditions of communication channels such as attenuation, interference, and frequency-selective fading. As the number of transmitters within a communication system (such as an OFDM system) increases, however, bandwidth can become overloaded, causing transmission speeds to suffer. A need therefore exists for improved systems, apparatuses and methods that facilitate the "fast" (i.e., high-speed) wireless communication of signals for a given number of subcarriers of a communications channel (e.g., within an OFDM system).

Some embodiments set forth herein address the foregoing challenges by generating an equiangular tight frame (ETF) or a nearly equiangular tight frame (NETF) and converting/transforming the ETF or NETF into a unitarily equivalent and sufficiently sparse matrix, such that it can be applied (e.g., as a code for transforming an input vector and/or symbols to be transmitted) in a high-speed manner. As used herein, an ETF refers to a sequence or set of unit vectors whose pair-wise inner products achieve equality in the Welch bound, and thus yields an optimal packing in a projective space. The ETF can include more unit vectors than there are dimensions of the projective space, and the unit vectors can be selected such that they are as close to mutually orthogonal as possible (i.e., such that the maximum of the magnitude of all the pair-wise dot-products is as small as possible). An NETF is an approximation of an ETF, and can be used in place of an ETF where an ETF does not exist, or where the ETF cannot be constructed exactly, for a given pair of dimensions. Systems and methods set forth herein facilitate the application of fast ETFs and fast NETFs by transforming the ETFs/NETFs into unitarily equivalent forms having sparse decompositions, which can therefore be applied in a high-speed manner.

In some embodiments, instead of an N×N unitary matrix, an N×K (where K>N) ETF or NETF is used, such that K symbols are accommodated by N subcarriers. Using an N×K ETF or NETF can produce multi-user interference, but in a very predictable and controllable way that can be effectively mitigated. Since applying an N×K matrix to a length K vector can involve O(KN) multiplications (i.e., a high computational complexity), embodiments set forth herein include transforming the ETF or NETF into a sufficiently sparse unitary matrix that can be applied in a high-speed manner, with a computation complexity of, for example, O(N).

In some embodiments, once an ETF/NETF has been defined, the ETF/NETF is "completed," to form a unitary matrix. As defined herein, "completion" refers to the addition of (K−N) rows to the N×K ETF/NETF so that the resulting K×K matrix is unitary. A series of unitary transformations can then be performed on the completed matrix to render it sparse, but still a unitarily equivalent ETF/NETF. In other words, the result is a unitary matrix, with N of the K columns forming a sparse ETF/NETF (also referred to herein as a fast ETF or a fastNETF). Because this ETF/NETF is sparse, it can be decomposed into a small number of operations. In some such implementation, a block of K symbols is received at or introduced into the system, and acted on using the fast ETF/NETF, resulting in a length N vector. A fast N×N unitary transformation (e.g., as shown and discussed below with reference to FIGS. 5-9) can then be applied to the length N vector, for example to enhance security of the communications. As used herein, a "fast" or "high-speed" transformation refers to one that can be performed using work that is on the order of no worse than O(N log N) or O(K log K) floating point operations, and/or to a matrix that has been generated by (1) completing a starting matrix, and (2) rendering the completed matrix sparse through a series of unitary transformations. In the foregoing, the "O" in the expressions O(N log N) and O(K log K) is "Big O" mathematical notation, indicating the approximate value that the relevant function/operation approaches.

In some embodiments, a block of K symbols is received at or introduced into the system, and is first acted on by a nonlinear transformation (e.g., as shown and described in U.S. patent application Ser. No. 16/459,254, filed Jul. 1, 2019 and titled "Communication System and Method using Orthogonal Frequency Division Multiplexing (OFDM) with Non-Linear Transformation," the entire contents of which are herein incorporated by reference in their entirety for all purposes), followed by the fast ETF/NETF to generate a length N vector, followed by a fast N×N unitary transformation (e.g., as shown and discussed below with reference to FIGS. 5-9) applied to the length N vector, for example to enhance security of the communications. In other embodiments, after a fast ETF/NETF is applied to an input vector to generate a length N vector, a full "fast" or high-speed unitary braid divisional multiplexing (UBDM) transformation (including a non-linear component) is applied. Example UBDM implementations can be found, by way of example, in U.S. patent application Ser. No. 16/459,254, referenced above.

Some embodiments set forth herein facilitate an increase to the data rate of digital communications, without increasing the bandwidth, the modulation, or the number of subcarriers used, using one or more ETFs and/or NETFs. An example method includes receiving or generating a data vector of length K>N, such that the incoming data vector is $\overline{B} \in \mathbb{C}^K$ (where $\mathbb{C}^K$ is K-dimensional complex space). In other words, $\overline{B}$ is a vector including K complex numbers. A generating matrix, including an N×K matrix $A \in \mathbb{C}^{N \times K}$, is identified. A "compressed" data vector can then be generated as follows:

$$\overline{b} = A\overline{B}, \quad (0.0.1)$$

where $\overline{b} \in \mathbb{C}^N$. This reduces the values in $\overline{B}$ down to a lower dimensional space. By selecting A to be an NETF, the overlap between the vectors can be minimized. Although the foregoing compression approach may result in the inclusion of errors introduced by non-orthogonal overlaps between the columns of A, such overlaps can be minimized/made as small as possible, to maximize the chances of recovering the data.

The application of the N×K NETF A will have a computational complexity of O(NK). To reduce the computational complexity, however, a large class of fast NETFs can be identified. For example, a matrix $A \in \mathbb{C}^{N \times K}$ can be identified such that the following are true:

A can be applied in a manner that is "fast" or high-speed (using work that is on the order of no worse than O(N log N) or O(K log K)), So that the following is produced (where $A^\dagger$ is a conjugate transpose of A):

$$A^\dagger A = \begin{pmatrix} 1 & \mu & \mu & \mu & \cdots \\ \mu & 1 & \mu & \mu & \cdots \\ \mu & \mu & 1 & \mu & \cdots \\ \mu & \mu & \mu & 1 & \cdots \\ \vdots & \vdots & \vdots & \vdots & \ddots \end{pmatrix} \quad (0.02)$$

The diagonal elements of example matrix (0.02) are exactly 1, and the off-diagonal elements have magnitude μ, which is equal to the Welch bound, $$\mu \approx \sqrt{\frac{K-N}{N(K-1)}}. \qquad (0.03)$$

The rows of example matrix (0.02) can be normalized so that $AA^\dagger \propto \Pi_N$ (where $\Pi_N$ is the N×N identity matrix). In other words, a matrix may be identified that is both an NETF and a matrix that can be operated "fast" (i.e., computational complexity no worse than O(N log N) or O(K log K)).

Completing NETFs

In some embodiments, given an NETF, rows can be added to the NETF to complete it thereby, transforming it into a unitary matrix. In other words, given the NETF $A \in \mathbb{C}^{N \times K}$, it is desirable to find a $B \in \mathbb{C}^{(K-N) \times K}$ so that the completed matrix $\tilde{A}$ is defined as follows, with the N×K "A" matrix" stacked on top of the (K−N)×K"B" matrix" to form a larger, combined matrix:

$$\tilde{A} = \begin{pmatrix} A \\ B \end{pmatrix} \in U(K). \qquad (0.0.4)$$

Consider again the matrix $A^\dagger A$ (0.02, above). The eigenvalues of the matrix $A^\dagger A$ are $$\frac{K}{N}$$

with multiplicity N and 0 with multiplicity K−N. So, consider the matrix $$\frac{K}{N}\mathbb{I}_K - A^\dagger A. \qquad (0.0.5)$$

If $\overline{v}$ is an eigenvector of $A^\dagger A$ with eigenvalue λ (where λ is either 0 or K/N), then because $$\left(\frac{K}{N}\mathbb{I}_K - A^\dagger A\right)\overline{v} = \left(\frac{K}{N} - \lambda\right)\overline{v}, \qquad (0.0.6)$$

where $\overline{v}$ is an eigenvector of this new matrix with eigenvalue either 0 (when λ=K/N) or K/N (when λ=0), it can be observed that this new matrix has rank K−N. As such, there exists a $B \in \mathbb{C}^{(k-N) \times k}$ such that:

$$B^\dagger B = \frac{K}{N}\mathbb{I}_K - A^\dagger A. \qquad (0.0.7)$$

To find this matrix, the eigen-decomposition of $B^\dagger B$ is first computed:

$$B^\dagger B = \frac{K}{N}\mathbb{I}_K - A^\dagger A = UDU^\dagger. \qquad (0.0.8)$$

It follows, then, that:

$$B^\dagger = U\sqrt{D'}, \qquad (0.0.9)$$

where D' is D truncated to only include columns with non-zero eigenvalues. Now, the matrix $\tilde{A}^\dagger \tilde{A}$ in (0.0.4) satisfies:

$$\tilde{A}^\dagger \tilde{A} = (A^\dagger \ B^\dagger)\begin{pmatrix} A \\ B \end{pmatrix} = A^\dagger A + B^\dagger B = A^\dagger A + \frac{K}{N}\mathbb{I}_K - A^\dagger A = \frac{K}{N}\mathbb{I}_K. \qquad (0.0.10)$$

As such, redefining $$\tilde{A} \leftarrow \sqrt{\frac{N}{K}} \tilde{A},$$

it can be observed that $\tilde{A}$ is the unitary completion of the NETF A.

Making the Completed NETF Fast

In some embodiments, a fast version of the unitary completion of the NETF, $\tilde{A}$, can be identified such that the columns in the first N rows still form an NETF. For example, taking any K×K unitary matrix whose first N rows form an ETF (in its columns) (in other words, the first N components of each column form an NETF), a unitary transform of the form U(N)⊕W can be performed, where W is any element of U(K−N), the result having the property that the first N rows form a column NETF.

For example, given a completed NETF of the form $$\tilde{A} = \begin{pmatrix} A \\ B \end{pmatrix}, \qquad (0.0.12)$$

where A is the NETF, the completed NETF can be acted on with a unitary of the form $$\tilde{W} = \begin{pmatrix} U & 0 \\ 0 & W \end{pmatrix}, \qquad (0.0.13)$$

where U is an N×N unitary matrix and W is a (K−N)×(K−N) unitary matrix. The resulting matrix $$\begin{pmatrix} U & 0 \\ 0 & W \end{pmatrix}\begin{pmatrix} A \\ B \end{pmatrix} = \begin{pmatrix} UA \\ WB \end{pmatrix} \qquad (0.0.14)$$

will still be unitary and will have the property that, taking only the first N rows, obtaining the N×K matrix UA, then because $$A^\dagger A \rightarrow A^\dagger U^\dagger UA = A^\dagger A, \qquad (0.0.15)$$

(cf (0.0.2)), the NETF property of the first N rows has been preserved.

As such, given an NETF A and completing it to produce $\tilde{A}$, any desired transformation can be applied, using unitary matrices that act, for example, only on the first N rows, and the result will still include an NETF in the first N rows.

Next, observe that, given any vector $$\tilde{v} = \begin{pmatrix} a \\ b \end{pmatrix}, \quad (0.0.16)$$

where a, b ∈ ℂ, a matrix can be constructed of the form:

$$\frac{1}{\sqrt{|a|^2 + |b|^2}} \begin{pmatrix} a^* & b^* \\ b & -a \end{pmatrix}. \quad (0.0.17)$$

This matrix will be unitary, and acts on $\bar{v}$ as follows, $$\frac{1}{\sqrt{|a|^2 + |b|^2}} \begin{pmatrix} a^* & b^* \\ b & -a \end{pmatrix} \begin{pmatrix} a \\ b \end{pmatrix} = \begin{pmatrix} \sqrt{|a|^2 + |b|^2} \\ 0. \end{pmatrix} \quad (0.0.18)$$

Using matrices of the form of (0.0.17), components of the initial matrix $\tilde{A}$ can be zeroed out one-by-one, until it has the following form:

$$\tilde{A} \rightarrow \begin{pmatrix} * & * & * & * & * & * & \ldots & * \\ 0 & * & * & * & * & * & \ldots & * \\ 0 & 0 & * & * & * & * & \ldots & * \\ 0 & 0 & 0 & * & * & * & \ldots & * \\ 0 & 0 & 0 & 0 & * & * & \ldots & * \\ \vdots & \vdots & \vdots & \vdots & \vdots & \vdots & \ldots & \vdots \\ * & * & * & * & * & * & \ldots & * \\ * & * & * & * & * & * & \ldots & * \\ \vdots & \vdots & \vdots & \vdots & \vdots & \vdots & \ldots & \vdots \\ * & * & * & * & * & * & \ldots & * \end{pmatrix} \quad (0.0.19)$$

Matrix (0.0.19) is a matrix in which, in the first N rows, the $n^{th}$ row begins with (n-1) leading zeros, and everything else is allowed to remain non-zero. Generating the matrix (0.0.19) will include $$\frac{N(N-1)}{2}$$

unitary operations, for example corresponding to a computational complexity of $O(N^2)$. Since the generation of the matrix (0.0.19) can be work that is performed only once, it can be polynomial. Notice that, since only unitary matrices were used in acting on the first N rows, the columns of the first N rows still form an NETF. This NETF can, in turn, be used as a "fast" or high-speed NETF.

Starting with this new (unitary) completed $\tilde{A}$ matrix (with the triangle of zeros as shown above), the completed $\tilde{A}$ matrix can be acted on with a unitary (of the form (0.0.17)) that zeroes out one of the non-zero components the last K–N rows. In other words, a matrix $J_1 \in U(K)$ can be applied to the completed $\tilde{A}$ matrix as follows:

$$J_1 \begin{pmatrix} * & * & * & * & * & * & \ldots & * \\ 0 & * & * & * & * & * & \ldots & * \\ 0 & 0 & * & * & * & * & \ldots & * \\ 0 & 0 & 0 & * & * & * & \ldots & * \\ 0 & 0 & 0 & 0 & * & * & \ldots & * \\ \vdots & \vdots & \vdots & \vdots & \vdots & \vdots & \ldots & \vdots \\ * & * & * & * & * & * & \ldots & * \\ * & * & * & * & * & * & \ldots & * \\ \vdots & \vdots & \vdots & \vdots & \vdots & \vdots & \ldots & \vdots \\ * & * & * & * & * & * & \ldots & * \end{pmatrix} = \begin{pmatrix} * & * & * & * & * & * & \ldots & * \\ 0 & * & * & * & * & * & \ldots & * \\ 0 & 0 & * & * & * & * & \ldots & * \\ 0 & 0 & 0 & * & * & * & \ldots & * \\ 0 & 0 & 0 & 0 & * & * & \ldots & * \\ \vdots & \vdots & \vdots & \vdots & \vdots & \vdots & \ldots & \vdots \\ 0 & * & * & * & * & * & \ldots & * \\ * & * & * & * & * & * & \ldots & * \\ \vdots & \vdots & \vdots & \vdots & \vdots & \vdots & \ldots & \vdots \\ * & * & * & * & * & * & \ldots & * \end{pmatrix} \quad (0.0.20)$$

This new matrix can then be acted on with another unitary matrix $J_2$ that zeros out another non-zero component in the last K–N rows, as follows:

$$J_3 \begin{pmatrix} * & * & * & * & * & * & \ldots & * \\ 0 & * & * & * & * & * & \ldots & * \\ 0 & 0 & * & * & * & * & \ldots & * \\ 0 & 0 & 0 & * & * & * & \ldots & * \\ 0 & 0 & 0 & 0 & * & * & \ldots & * \\ \vdots & \vdots & \vdots & \vdots & \vdots & \vdots & \ldots & \vdots \\ 0 & * & * & * & * & * & \ldots & * \\ * & * & * & * & * & * & \ldots & * \\ \vdots & \vdots & \vdots & \vdots & \vdots & \vdots & \ldots & \vdots \\ * & * & * & * & * & * & \ldots & * \end{pmatrix} = \begin{pmatrix} * & * & * & * & * & * & \ldots & * \\ 0 & * & * & * & * & * & \ldots & * \\ 0 & 0 & * & * & * & * & \ldots & * \\ 0 & 0 & 0 & * & * & * & \ldots & * \\ 0 & 0 & 0 & 0 & * & * & \ldots & * \\ \vdots & \vdots & \vdots & \vdots & \vdots & \vdots & \ldots & \vdots \\ 0 & * & * & * & * & * & \ldots & * \\ 0 & * & * & * & * & * & \ldots & * \\ \vdots & \vdots & \vdots & \vdots & \vdots & \vdots & \ldots & \vdots \\ * & * & * & * & * & * & \ldots & * \end{pmatrix} \quad (0.021)$$

The foregoing process can proceed until all of the lower off-diagonal elements of $\tilde{A}$ are zero. Note that because $\tilde{A}$ is unitary, there is no need to separately zero anything above the diagonal, since zeroing the lower off-diagonals will automatically zero the upper off diagonals. Zeroing all of the lower off-diagonals can involve $$(K-N)N + \frac{1}{2}(K-N)(K-N-1) \quad (0.0.22)$$

unitary operations. If $\Delta \equiv K - N$, this is:

$$\Delta N + \frac{1}{2} \Delta (\Delta - 1),$$

which has a computational complexity of O(N).

As a result of the foregoing process, $\tilde{A}$ will have been transformed to the identity matrix using, $J_1, J_2, \ldots, J_{\Delta N + \frac{1}{2}\Delta(\Delta-1)}$. In other words, if $\tilde{A}_0$ is denoted as the unitary matrix with the triangle of zeros as in (0.0.19), the following is obtained:

$$J_{\Delta N + \frac{1}{2}\Delta(\Delta-1)} \ldots J_2 J_1 \tilde{A}_0 = \mathbb{I}_K. \quad (0.0.24)$$

Therefore, $$\tilde{A}_0 = J_1^\dagger J_2^\dagger \ldots J_{\Delta N + \frac{1}{2}\Delta(\Delta-1)}^\dagger. \quad (0.0.25)$$

Since $\tilde{A}_0$ is a completed NETF (i.e., the columns of the first N rows form an NETF), and $\hat{A}_0$ can be formed by the product of O(N) unitary matrices, each of which is sparse, a fast NETF has been identified. Note that, at this stage, only O(N) work has been performed (i.e., a computational complexity of O(N)). It is possible to leave additional values of the triangle of zeros in $\tilde{A}_0$ non-zero, and include them as $J_i$ matrices, if additional computing resources are available (e.g., if reducing work or computational complexity is not a priority). In some implementations, a block of data of length K enters the system, and as a first step, a fast NETF is applied to reduce the block of data to size N<K with O(N) work, and then a fast unitary is applied, with O(N log N) work, for example to add security features, with an associated complexity of O(N log N+N)=O(N log N).

System Overview

FIG. 1 is a block diagram illustrating an example electronic communications system, according to an embodiment. As shown in FIG. 1, a system 100 includes one or multiple signal transmitters 120 and one or multiple signal receivers 150. Each signal transmitter 120 can include one or more of: processing circuitry 124, transceiver circuitry 140 (i.e., circuitry for transmitting signals and circuitry for receiving signals), and non-transitory processor-readable memory 126. The memory 126 can store symbols 128, transformation matrices 130, transformed symbols 132, data vectors 134, permutations 136, or primitive transformation matrices 138. Data (e.g., symbols 128) can be received at the signal transmitter(s) 120, for example, from one or more remote compute devices and/or via a local interface (e.g., a graphical user interface (GUI)) operably coupled to the signal transmitter(s) 120. Similarly, each signal receiver 150 can include one or more of: processing circuitry 152, transceiver circuitry 168 (i.e., circuitry for transmitting signals and circuitry for receiving signals), and non-transitory processor-readable memory 154. The memory 154 can store symbols 156, transformation matrices 158, transformed symbols 160, data vectors 162, permutations 164, or primitive transformation matrices 166. The signal transmitter(s) 120 can transmit signals to the signal receiver(s) 150 via one or more communications channels of a transmission medium (e.g., free space, wireless or wired local area network, wireless or wired wide area network, etc.).

Each of the memories 126 and 154, of the one or more signal transmitters 120 and the one or more signal receivers 150, respectively, can store instructions, readable by the associated processing circuitry (124 and 152, respectively) to perform method steps. Alternatively or in addition, instructions and/or data (e.g., symbols 156, transformation matrices 158, transformed symbols 160, data vectors 162, permutations 164, and/or primitive transformation matrices 166) can be stored in storage media 112 and/or 114 (e.g., memory of a remote compute device) and accessible to the signal transmitter(s) 120 and/or signal receiver(s) 150, respectively, for example via wireless or wired communication. For example, one or more signal transmitters 120 can store and/or access instructions to generate a set of symbols that includes K symbols, where K is a positive integer, and to generate a first transformation matrix. The first transformation matrix can include an equiangular tight frame (ETF) transformation or a nearly equiangular tight frame (NETF) transformation, having dimensions N×K, where N is a positive integer and has a value less than K. The one or more signal transmitters 120 can also store and/or access instructions to generate a second transformation matrix based on the first transformation matrix (e.g., by adding K−N rows to the first transformation matrix), the second transformation matrix having dimensions K×K. The one or more signal transmitters 120 can also store and/or access instructions to generate a third transformation matrix by performing a series of unitary transformations on the second transformation matrix (e.g., having a computational complexity or cost of $O(N \log_2 N)$ arithmetic operations or O(N) arithmetic operations), the third transformation matrix having dimensions K×K, and to produce a set of transformed symbols based on the third transformation matrix and the set of symbols (e.g., by encoding each symbol from the set of symbols based on at least one layer from the set of layers). The second transformation matrix and/or the third transformation matrix can include a unitary transformation. Producing the set of transformed symbols can have a computational complexity of $O(N \log_2 N)$ arithmetic operations. The one or more signal transmitters 120 can include a set of antenna arrays (not shown) configured to perform Multiple Input Multiple Output (MIMO) operations. In some embodiments, the one or more signal transmitters 120 also stores instructions to decompose the third transformation matrix into a set of layers, each layer from the set of layers including a permutation and a primitive transformation matrix having dimensions M×M, M being a positive integer having a value smaller than N.

Figure 2A:
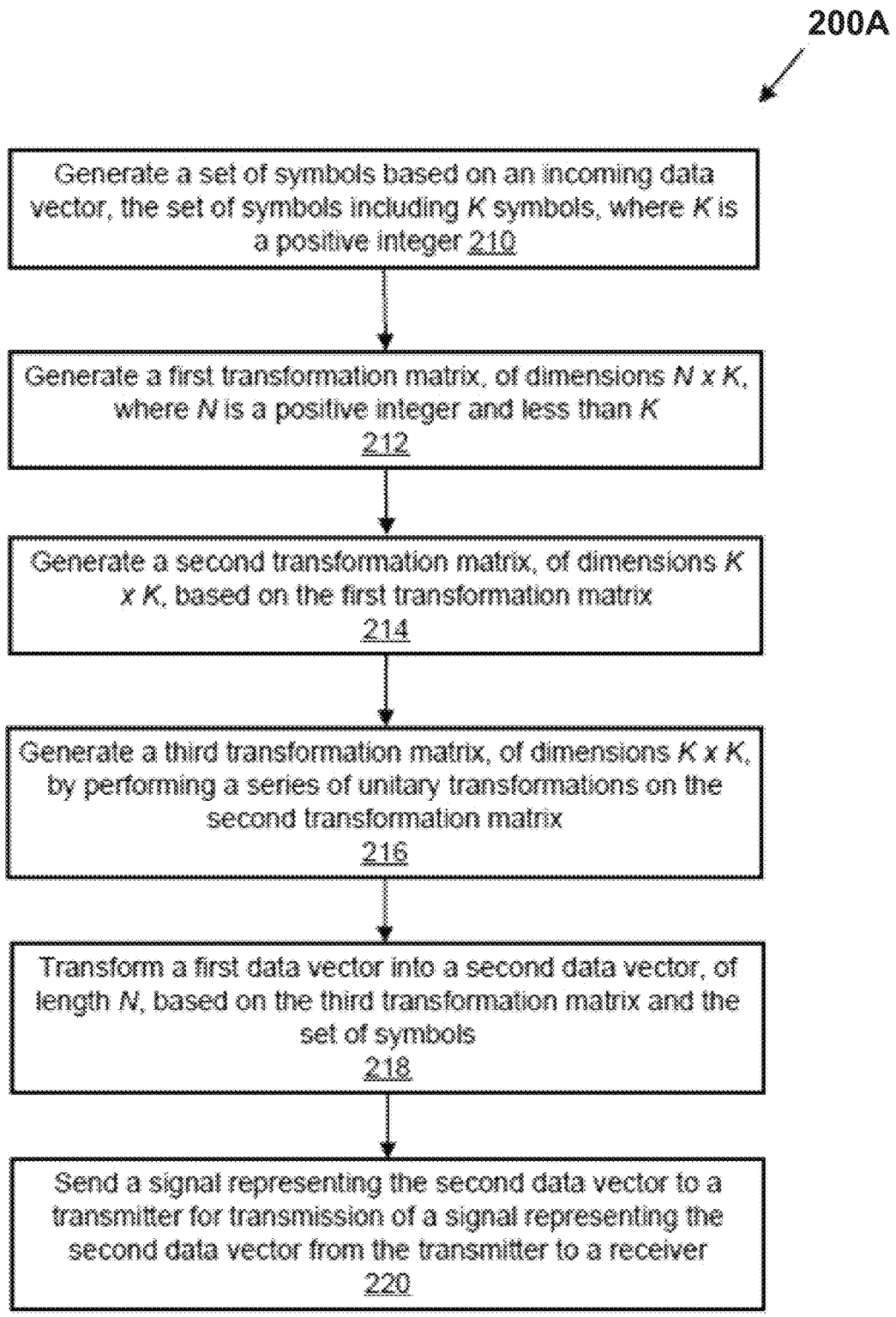
FIG. 2A is a flowchart illustrating a first example method for generating and transmitting transformed symbols, according to an embodiment.

FIG. 2A is a flowchart illustrating a first example method for generating and transmitting transformed symbols, according to an embodiment. As shown in FIG. 2A, the method 200A includes generating, at 210 and via a processor of a first compute device, a set of symbols based on an incoming data vector. The set of symbols includes K symbols, where K is a positive integer. A first transformation matrix is then generated, at 212, the first transformation matrix including one of an equiangular tight frame (ETF) transformation or a nearly equiangular tight frame (NETF) transformation. The first transformation matrix has dimensions of N×K, where N is a positive integer having a value that is less than K. The method 200 also includes generating, at 214, a second transformation matrix based on the first transformation matrix (e.g., by adding K−N rows to the first transformation matrix). The second transformation matrix has dimensions of K×K. At 216, a third transformation matrix is generated by performing a series of unitary transformations (e.g., having an associated computational cost of O(N) arithmetic operations) on the second transformation matrix. The third transformation matrix has dimensions of K×K. The second transformation matrix and/or the third transformation matrix can include a unitary transformation. A first data vector is transformed, at 218, into a second data vector having a length N based on the third transformation matrix and the set of symbols. A signal representing the second data vector is sent, at 220, to a transmitter for transmission of a signal representing the second data vector from the transmitter to a receiver that recovers a transmitted message. The receiver can include a set of antenna arrays. The receiver and the transmitter can be configured to perform Multiple Input Multiple Output (MIMO) operations.

Although not shown in FIG. 2A, in some embodiments, the method 200 also includes sending a signal representing the third transformation matrix to a second compute device prior to transmission of the signal representing the second data vector from the transmitter to the receiver, for recovery of the set of symbols (i.e., recovery of a message) at the receiver. Alternatively or in addition, in some embodiments, the method 200 also includes decomposing the third transformation matrix into a set of layers, each layer from the set of layers including a permutation and a primitive transformation matrix having dimensions of M×M, M being a positive integer having a value smaller than N. The second data vector can be based on at least one layer from the set of layers.

FIG. 2B is a flowchart illustrating an alternative implementation of the first example method for generating and transmitting transformed symbols, according to an embodiment. As shown in FIG. 2B, the method 200B includes generating, at 210 and via a processor of a first compute device, a set of symbols based on an incoming data vector. The set of symbols includes K symbols, where K is a positive integer. At 211, a nonlinear transformation is applied to the set of symbols to produce a set of transformed symbols. A first transformation matrix is then generated, at 212, the first transformation matrix including one of an equiangular tight frame (ETF) transformation or a nearly equiangular tight frame (NETF) transformation. The first transformation matrix has dimensions of N×K, where N is a positive integer having a value that is less than K. The method 200 also includes generating, at 214, a second transformation matrix based on the first transformation matrix (e.g., by adding K−N rows to the first transformation matrix). The second transformation matrix has dimensions of K×K. At 216, a third transformation matrix is generated by performing a series of unitary transformations (e.g., having an associated computational cost of O(N) arithmetic operations) on the second transformation matrix. The third transformation matrix has dimensions of K×K. The second transformation matrix and/or the third transformation matrix can include a unitary transformation. A first data vector is transformed, at 218, into a second data vector having a length N based on the third transformation matrix and the set of symbols. At 219, a fast unitary transformation is applied to the second data vector to produce a third data vector. A signal representing the third data vector is sent, at 220, to a transmitter for transmission of a signal representing the third data vector from the transmitter to a receiver that recovers a transmitted message. The receiver can include a set of antenna arrays. The receiver and the transmitter can be configured to perform Multiple Input Multiple Output (MIMO) operations.

Figure 3:
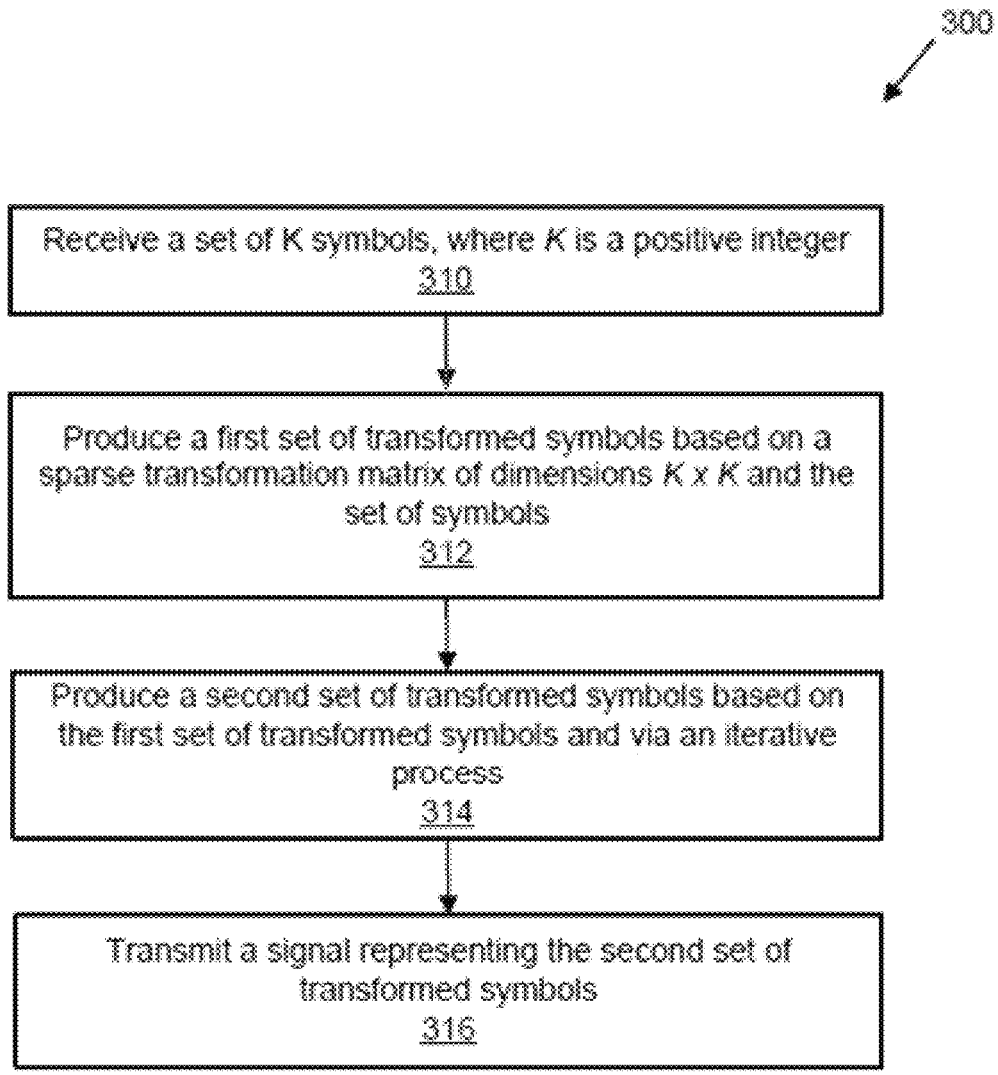
FIG. 3 is a flowchart illustrating a second example method for generating and transmitting transformed symbols, according to an embodiment.

FIG. 3 is a flowchart illustrating a second example method for generating and transmitting transformed symbols, according to an embodiment. As shown in FIG. 3, the method 300 includes receiving, at 310 and via a receiver, a set of symbols. The set of symbols includes K symbols, where K is a positive integer. A first set of transformed symbols is produced, at 312, based on a sparse transformation matrix having dimensions K×K and the set of symbols (e.g., an application of a fast ETF, as discussed above). Producing the first set of transformed symbols can have an associated computational complexity of O(N log$_2$ N) arithmetic operations. A second set of transformed symbols is produced, at 314, based on the first set of transformed symbols. The producing the second set of transformed symbols at 314 can include an iterative process, with each iteration of the iterative process including: (a) a permutation followed by (b) an application of at least one primitive transformation matrix having dimensions M×M, M being a positive integer. Producing the second set of transformed symbols can have an associated computational complexity of O(N log$_2$ N) arithmetic operations. The method 300 also includes transmitting, at 316 and from a transmitter, a signal representing the second set of transformed symbols (e.g., to a receiver that subsequently recovers the original set of symbols, at a rate that is faster than can be accomplished using known receiver technologies). The transmitter can include a set of antenna arrays, and can be configured to perform MIMO operations.

In some embodiments, the sparse transformation matrix of method 300 is a third transformation matrix, and the method 300 also includes generating a first transformation matrix via a processor of a compute device operatively coupled to the transmitter. The first transformation matrix includes an ETF transformation, or a NETF transformation, the first transformation matrix having dimensions N×K, where K is a positive integer and K has a value larger than N. A second transformation matrix can be generated, based on the first transformation matrix, having dimensions K×K. The third transformation matrix can be generated by performing a series of unitary transformations on the second transformation matrix.

Example of Fast ETF Construction

An example algorithm for producing a fast ETF is set forth in this section. Suppose a vector (N, K)=(3, 4), for which the Welch bound is $$\mu = \sqrt{\frac{K-N}{N(K-1)}} = \sqrt{\frac{4-3}{3(3)}} = \frac{1}{3}. \tag{0.0.26}$$

Next, suppose that the following NETF is generated based on the vector (N, K) (rounding to two decimal places):

$$A = \begin{pmatrix} -.15+.86i & -.71+.15i & .02-.21i & 0 \\ -.26+.23i & .60+.05i & -.23-.89i & 0 \\ -.07-.33i & -.30+.14i & -.27-.19i & 1 \end{pmatrix} \tag{0.0.27}$$

It can be directly confirmed, taking the absolute value of each term, that:

$$A^\dagger A = \begin{pmatrix} 1 & 1/3 & 1/3 & 1/3 \\ 1/3 & 1 & 1/3 & 1/3 \\ 1/3 & 1/3 & 1 & 1/3 \\ 1/3 & 1/3 & 1/3 & 1 \end{pmatrix} \tag{0.0.28}$$

Next, B$^\dagger$B can be constructed as follows:

$$B^\dagger B = \frac{K}{N}\mathbb{I}_K - A^\dagger A = \tag{0.0.29}$$

$$\begin{pmatrix} .33 & -.07-.33i & .25-.22i & .07-.32i \\ -.07+.33i & .33 & .17+.29i & .30+.14i \\ .25+.22i & .17-.29i & .33 & .27-.19i \\ .07+.33i & .30-.14i & .27+.19i & .33 \end{pmatrix}$$

The Eigen-decomposition of matrix (0.0.29), B$^\dagger$B=UDU$^\dagger$, can then be found, where $$U = \begin{pmatrix} .11-.49i & -.06+.03i & -.08+.55i & .04-.66i \\ .46+.20i & .52-.45i & -.11-.05i & -.47-.20i \\ .41-.29i & .19+.70i & -.14+.05i & -.31+.34i \\ .50 & 0 & .81 & .30 \end{pmatrix} \tag{0.0.30}$$

and

-continued $$D = \begin{pmatrix} 1.33 & 0 & 0 & 0 \\ 0 & 0 & 0 & 0 \\ 0 & 0 & 0 & 0 \\ 0 & 0 & 0 & 0 \end{pmatrix}$$

Multiplying these to obtain $B^\dagger$:

$$B^\dagger = \qquad (0.0.32)$$

$$U\sqrt{D'} = \begin{pmatrix} .11-.49i & -.06+.03i & -.08+.55i & .04-.66i \\ .46+.20i & .52-.45i & -.11-.05i & -.47-.20i \\ .41-.29i & .19+.70i & -.14+.05i & -.31+.34i \\ .50 & 0 & .81 & .30 \end{pmatrix}$$

$$\begin{pmatrix} \sqrt{1.33} \\ 0 \\ 0 \\ 0 \end{pmatrix} = \begin{pmatrix} .13+.57i \\ .53+.23i \\ .47-.33i \\ .58 \end{pmatrix}$$

$\tilde{A}$ can then be constructed, as follows:

$$\tilde{A} = \sqrt{\frac{N}{K}}\left(\frac{A}{B}\right) = \begin{pmatrix} -.13+.75i & -.61+.13i & .02-.18i & 0 \\ -.23+.20i & .52+.04i & -.20-.77i & 0 \\ -.06-.28i & -.26+.12i & -.24-.17i & .87 \\ .11+.49i & .46-.20i & .41+.29i & .5 \end{pmatrix} \qquad (0.0.33)$$

The matrix $\tilde{A}$ is unitary. Next, the lower off-diagonal triangle in the upper N×N block can be zeroed out. For example, the (1, 1) component can be used to zero the (2, 1) component. The unit unitary matrix for this is:

$$\frac{1}{\sqrt{|-.13+.75i|^2 + |-.23+.2i|^2}} \begin{pmatrix} -.13-.75i & -.23-.2i \\ -.23+.2i & .13-.75i \end{pmatrix} = \qquad (0.0.34)$$

$$\begin{pmatrix} -.16-.92i & -.28-.25i \\ -.28+.25i & .16-.92i \end{pmatrix}$$

The (2, 1) component can be eliminated by acting on $\tilde{A}$, with this matrix expanded to the appropriate 4×4. In other words, $$\begin{pmatrix} -.16-.91i & -.28-.25i & 0 & 0 \\ -.28+.25i & .16-.92i & 0 & 0 \\ 0 & 0 & 1 & 0 \\ 0 & 0 & 0 & 1 \end{pmatrix} \qquad (0.0.35)$$

$$\begin{pmatrix} -.13+.75i & -.61+.13i & .02-.18i & 0 \\ -.23+.20i & .52+.04i & -.20-.77i & 0 \\ -.06-.28i & -.26+.12i & -.24-.17i & .87 \\ .11+.49i & .46-.20i & .41+.29i & .5 \end{pmatrix} =$$

$$\begin{pmatrix} .82 & .08+.34i & -.30+.27i & 0 \\ 0 & .26-.66i & -.70+.11i & 0 \\ -.06-.28i & -.26+.12i & -.24-.17i & .87 \\ .11+.49i & .46-.20i & .41+.29i & .5 \end{pmatrix}$$

Next, the (3, 1) component can be removed by constructing the same matrix from the (1, 1) and (3, 1) components. This multiplication is:

$$\begin{pmatrix} .94 & 0 & -.07+.33i & 0 \\ 0 & 1 & 0 & 0 \\ -.07-.33i & 0 & -.94 & 0 \\ 0 & 0 & 0 & 1 \end{pmatrix} \qquad (0.0.36)$$

$$\begin{pmatrix} .82 & .08+.34i & -.30+.27i & 0 \\ 0 & .26-.66i & -.70+.11i & 0 \\ -.06-.28i & -.26+.12i & -.24-.17i & .87 \\ .11+.49i & .46-.20i & .41+.29i & .5 \end{pmatrix} =$$

$$\begin{pmatrix} .87 & .06+.28i & -.21+.19i & -.06+.12i \\ 0 & .26-.66i & -.70+.11i & 0 \\ 0 & .37-.17i & .33+.24i & -.82 \\ .11+.49i & .46-.20i & .41+.29i & .5 \end{pmatrix}$$

Additional matrix operations can be performed, in a similar manner, until arriving at:

$$\tilde{A}_0 = \begin{pmatrix} .87 & .06+.28i & -.21+.19i & -.06+.12i \\ 0 & .82 & -.21-.35i & -.37-.17i \\ 0 & 0 & -.59+.39i & .26-.66i \\ .11+.49i & .46-.20i & .41+.29i & .5 \end{pmatrix} \qquad (0.0.37)$$

The matrix (0.0.37) is the pattern of zeros that will be obtained as part of a pre-processing step. The first three rows of $\tilde{A}_0$ will be the 3×4 ETF that will be used.

Next, a sparse decomposition of $\tilde{A}_0$ can be constructed. Note that there are three terms to eliminate: the (4, 1) component, the (4, 2) component, and the (4, 3) component. To accomplish this, a unitary is constructed (from the (1, 1) and (4, 1) components):

$$J_1 = \begin{pmatrix} .87 & 0 & 0 & .11-.49i \\ 0 & 1 & 0 & 0 \\ 0 & 0 & 1 & 0 \\ .11+.49i & 0 & 0 & -.87 \end{pmatrix}$$

This results in $J_1\tilde{A}_0$ being:

$$J_1\tilde{A}_0 = \begin{pmatrix} 1 & 0 & 0 & 0 \\ 0 & .82 & -.21-.35i & -.37-.17i \\ 0 & 0 & -.59+.39i & .26-.66i \\ 0 & .54-.23i & .47+.33i & -.5-0.2i \end{pmatrix} \qquad (0.0.39)$$

Continuing with this process, the 2, 2 component is used to eliminate the (4, 2) component, with the matrix:

$$J_2 = \begin{pmatrix} 1 & 0 & 0 & 0 \\ 0 & .82 & 0 & -.54-.23i \\ 0 & 0 & 1 & 0 \\ 0 & -.54+.23i & 0 & -.82 \end{pmatrix} \qquad (0.0.40)$$

Multiplying $J_1 \tilde{A}_0$ with $J_2$ results in:

$$J_2 J_1 \tilde{A}_0 = \begin{pmatrix} 1 & 0 & 0 & 0 \\ 0 & 1 & 0 & 0 \\ 0 & 0 & -.59+.39i & .26-.66i \\ 0 & 0 & .58+.41i & .65+.02i \end{pmatrix} \quad (0.0.41)$$

Next, the (4, 3) component can be eliminated with the (3, 3) component, using:

$$J_3 = \begin{pmatrix} 1 & 0 & 0 & 0 \\ 0 & 1 & 0 & 0 \\ 0 & 0 & -.59-.39i & .58-.41i \\ 0 & 0 & .58+.41i & .59-.39i \end{pmatrix} \quad (0.0.42)$$

This gives:

$$J_3 J_2 J_1 \tilde{A}_0 = \begin{pmatrix} 1 & 0 & 0 & 0 \\ 0 & 1 & 0 & 0 \\ 0 & 0 & 1 & 0 \\ 0 & 0 & 0 & .84-.54i \end{pmatrix} \quad (0.0.43)$$

Then, to set the correct phase on the last term, the matrix (0.0.43) can be multiplied by a final term $J_4$:

$$J_4 = \begin{pmatrix} 1 & 0 & 0 & 0 \\ 0 & 1 & 0 & 0 \\ 0 & 0 & 1 & 0 \\ 0 & 0 & 0 & .84+.54i \end{pmatrix} \quad (0.0.44)$$

Such multiplication results in:

$$J_4 J_3 J_2 J_1 \tilde{A}_0 = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (0.0.45)$$

such that:

$$\tilde{A}_0 = J_1^\dagger J_2^\dagger J_3^\dagger J_4^\dagger, \quad (0.0.46)$$

and the multiplication (0.0.46) can be performed to confirm that it matches (0.0.37).

Figure 4:
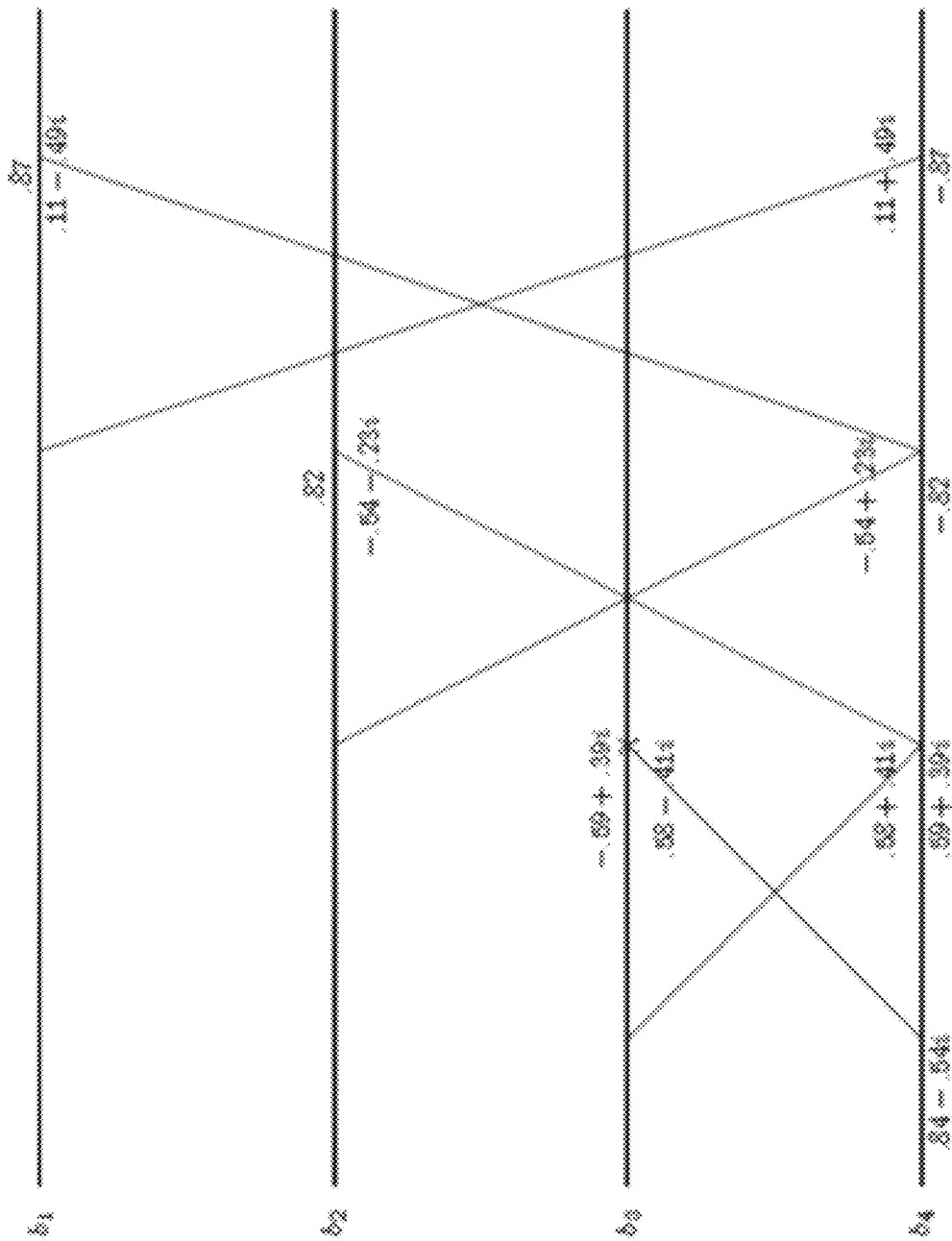
FIG. 4 is a wire diagram generated during an example method for producing a fast ETF, according to an embodiment.

In an example implementation of the foregoing, and given a vector $\bar{b}$ of four data symbols, a wire diagram can be constructed as shown in FIG. 4. The lines and numbers of FIG. 4 can be understood in a similar manner to that of a Discrete Fourier Transform (DFT) diagram, such as is shown and described below with reference to FIG. 6, or in a similar manner to that of a Fast Fourier transform (FFT) diagram, in that a given value gets multiplied by the number next to its incoming line, and then the values are added together at the nodes. For example, the node marked with an X should be understood to be the value coming in on the top line multiplied by −0.59+0.39i, and added to the number coming in from the bottom times 0.58−0.41i. Once the output of the operations shown in FIG. 4 are obtained, the last K−N=4−3=1 values can be truncated, retaining only the first N=3 (i.e., vector "N"). This vector N is the "overloaded" list of symbols that can then be transmitted. In some embodiments, the vector N can be further operated on by an arbitrary fast general unitary, for example of the form described in U.S. patent application Ser. No. 16/459,262, incorporated herein by reference, and as discussed below. Once received at a receiver, any fast general unitary can be removed from the vector N, and the receiver can "zero pad" (i.e., add/append zeros to) the received (length N) vector to length K, and apply the (fast) inverse of $\tilde{A}_0$.

Example Fast Unitary Transformations—System and Methods

Figure 5A:
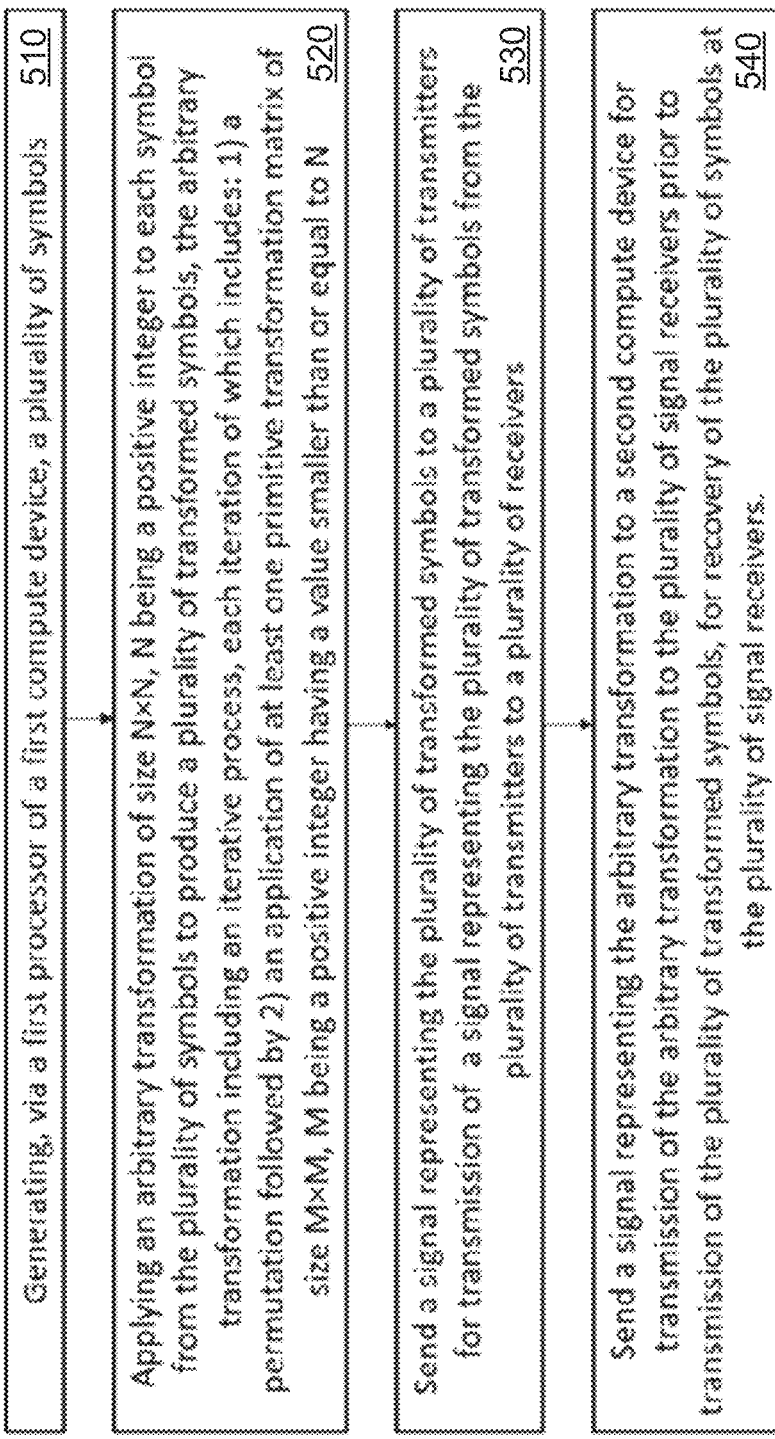
FIG. 5A is a flowchart illustrating a method of communication using a layered construction of an arbitrary matrix, according to an embodiment.

FIG. 5A is a flowchart illustrating a method of communication using a layered construction of an arbitrary matrix (acting, for example, on a length N vector resulting from an ETF/NETF transformation as discussed above), according to an embodiment. The method 500A includes, at 510, generating, via a first processor of a first compute device, a plurality of symbols. The method 500 also includes, at 520, applying an arbitrary transformation of size N×N to each symbol from the plurality of symbols to produce a plurality of transformed symbols, where N is a positive integer. The arbitrary transformation includes an iterative process (e.g., including multiple layers), and each iteration includes: 1) a permutation followed by 2) an application of at least one primitive transformation matrix of size M×M, where M is a positive integer having a value smaller than or equal to N. At 530, a signal representing the plurality of transformed symbols is sent to a plurality of transmitters, which transmits a signal representing the plurality of transformed symbols to a plurality of receivers. The method 500A also includes, at 540, sending a signal representing the arbitrary transformation to a second compute device for transmission of the arbitrary transformation to the plurality of signal receivers prior to transmission of the plurality of transformed symbols, for recovery of the plurality of symbols at the plurality of signal receivers.

Figure 5B:
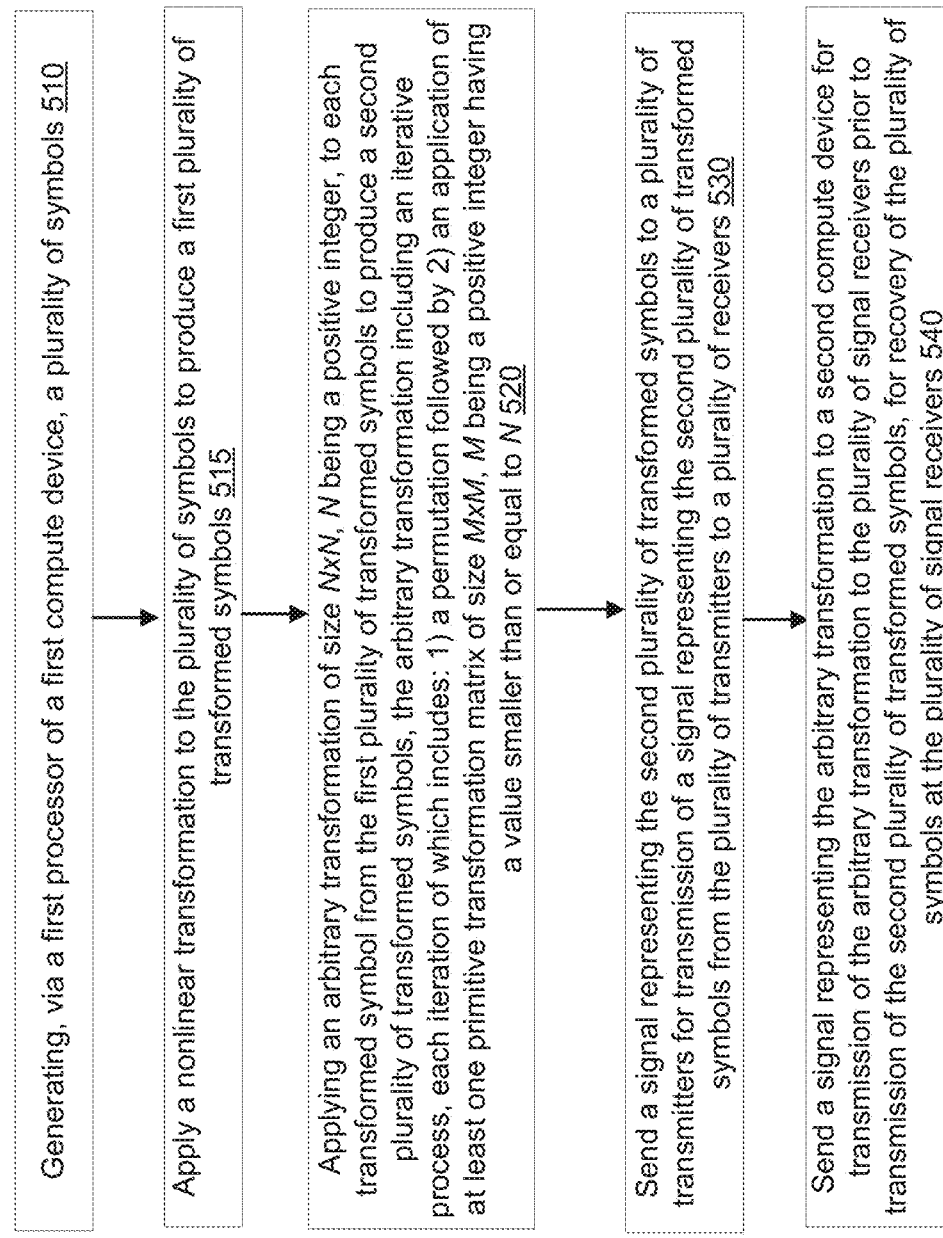
FIG. 5B is a flowchart illustrating an alternative implementation of the method of communication using a layered construction of an arbitrary matrix.

FIG. 5B is a flowchart illustrating an alternative implementation of the method 500A of FIG. 5A. The method 500B includes, at 510, generating, via a first processor of a first compute device, a plurality of symbols. At 515, a nonlinear transformation is applied to the plurality of symbols to produce a first plurality of transformed signals. The method 500B also includes, at 520, applying an arbitrary transformation of size N×N to each transformed symbol from the first plurality of transformed symbols to produce a second plurality of transformed symbols, where N is a positive integer. The arbitrary transformation includes an iterative process (e.g., including multiple layers), and each iteration includes: 1) a permutation followed by 2) an application of at least one primitive transformation matrix of size M×M, where M is a positive integer having a value smaller than or equal to N.

At 530, a signal representing the second plurality of transformed symbols is sent to a plurality of transmitters, which transmits a signal representing the second plurality of transformed symbols to a plurality of receivers. The method 500B also includes, at 540, sending a signal representing the arbitrary transformation to a second compute device for transmission of the arbitrary transformation to the plurality of signal receivers prior to transmission of the second plurality of transformed symbols, for recovery of the plurality of symbols at the plurality of signal receivers.

In some embodiments, the plurality of signal receivers includes a plurality of antenna arrays, and the plurality of signal receivers and the plurality of signal transmitters are configured to perform Multiple Input Multiple Output (MIMO) operations. In some embodiments, the arbitrary transformation includes a unitary transformation. In some embodiments, the arbitrary transformation includes one of a Fourier transform, a Walsh transform, a Haar transform, a slant transform, or a Toeplitz transform.

In some embodiments, each primitive transformation matrix from the at least one primitive transformation matrix has a dimension (e.g., a length) with a magnitude of 2, and a number of iterations of the iterative process is $\log_2 N$. In some embodiments, any other appropriate lengths can be used for the primitive transformation matrix. For example, the primitive transformation matrix can have a length greater than 2 (e.g., 3, 4, 5, etc.). In some embodiments, the primitive transformation matrix includes a plurality of smaller matrices having diverse dimensions. For example, the primitive transformation matrix can include block-U(m) matrices, where m can be different values within a single layer or between different layers.

The fast matrix operations in the methods 500A and 500B (e.g., 520) can be examined in greater detail with reference to Discrete Fourier Transform (DFT). Without being bound by any particular theory or mode of operation, the DFT of a vector $\bar{b}=(b_0, b_1, \ldots; b_{N-1})$, denoted $\bar{B}$, with components $B_k$, can be given by:

$$B_k = \sum_{n=0}^{N-1} b_n w_N^{nk} \tag{18}$$

where $$\omega_N = e^{\frac{2\pi i}{N}}.$$

Generally, a DFT involves $N^2$ multiplies when carried out using naive matrix multiplication, as illustrated by Equation (18). The roots of unity $\omega_N$, however, have a set of symmetries that can reduce the number of multiplications. To this end, the sum in Equation (18) can be separated into even and odd terms, as (assuming for now that N is a multiple of 2):

$$B_k = \tag{19}$$

$$\sum_{n=0}^{\frac{N}{2}-1} b_{2n} w_N^{2nk} + \sum_{n=0}^{\frac{N}{2}-1} b_{2n+1} w_N^{2(n+1)k} = \sum_{n=0}^{\frac{N}{2}-1} b_{2n} w_N^{2nk} + w_N^k \sum_{n=0}^{\frac{N}{2}-1} b_{2n+1} w_N^{2nk}$$

In addition:

$$w_N^{2nk} = e^{\frac{2\pi i 2nk}{N}} = e^{\frac{2\pi i nk}{N/2}} = w_{N/2}^n k \tag{20}$$

So $B_k$ can be written as:

$$B_k = \sum_{n=0}^{\frac{N}{2}-1} b_{2n} w_{N/2}^{nk} + w_N^k \sum_{n=0}^{\frac{N}{2}-1} b_{2n+1} w_{N/2}^{nk} \tag{21}$$

Now k runs over twice the range of n. But consider the follow equation:

$$w_{N/2}^{n(\frac{N}{2}+k)} = e^{\frac{2\pi i n(\frac{N}{2}+k)}{N/2}} = e^{2\pi i n} e^{\frac{2\pi i nk}{N/2}} = e^{\frac{2\pi i nk}{N/2}} \tag{22}$$

As a result, the "second half" of the k values in the N/2 point Fourier transform can be readily computed.

In DFT, the original sum to get $B_k$ involves N multiplications. The above analysis breaks the original sum into two sets of sums, each of which involves N/2 multiplications. Now the sums over n are from 0 to N/2−1, instead of being over the even or odds. This allows one to break them apart into even and odd terms again in exactly the same way as done above (assuming N/2 is also a multiple of 2). This results in four sums, each of which has N/4 terms. If N is a power of 2, the break-down process can continue all the way down to 2 point DFT multiplications.

Figure 6:
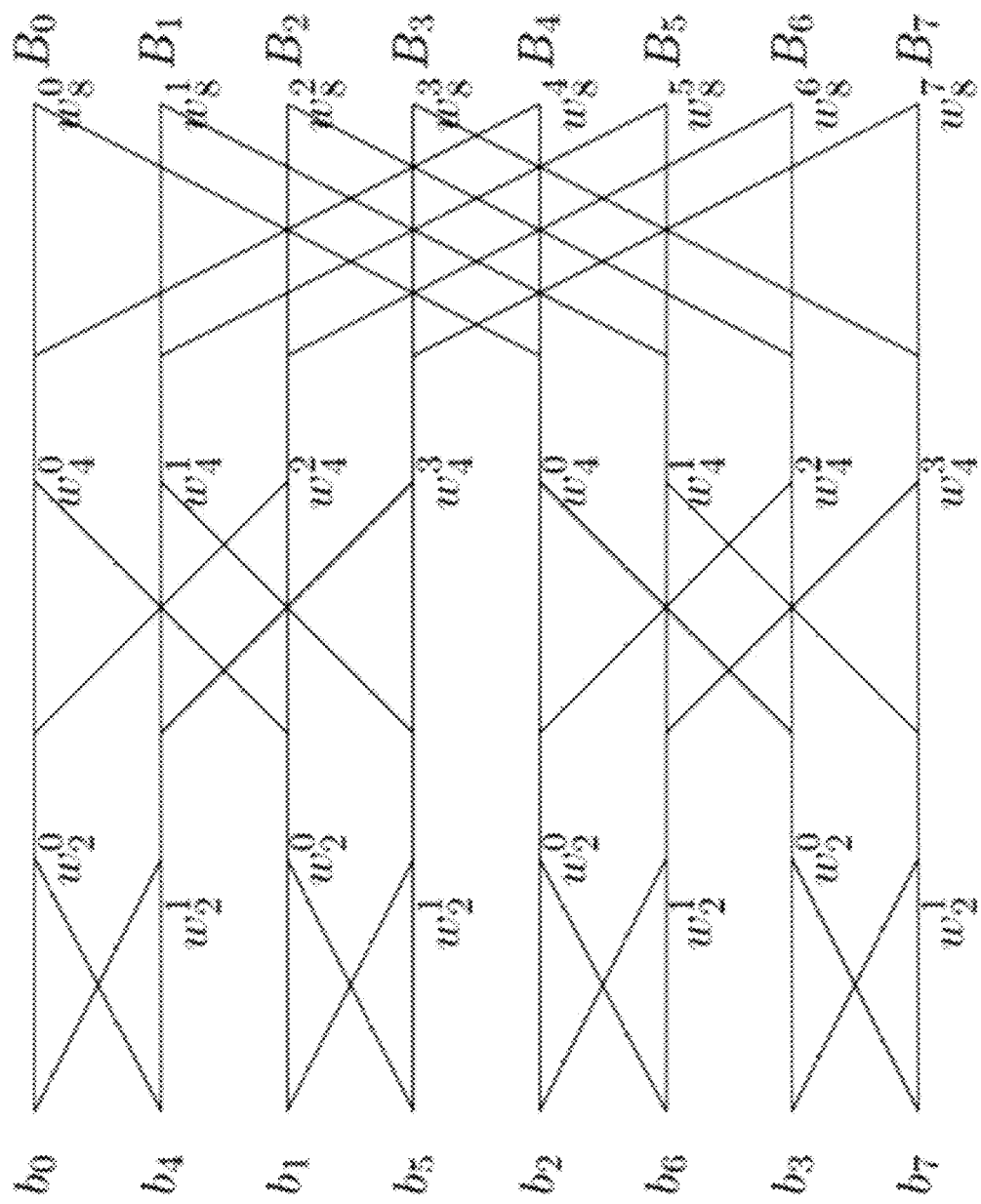
FIG. 6 is a diagram illustrating discrete Fourier Transform (DFT) of a vector $\vec{b}=(b_0, b_1, \ldots, b_{N-1})$.

FIG. 6 is a diagram illustrating discrete Fourier Transform (DFT) of a vector $\bar{b}=(b_0, b_1, \ldots; b_{N-1})$. The $\omega_N$ values are multiplied by the number on the lower incoming line to each node. At each of the three columns in FIG. 6, there are N multiplications, and the number of columns can be divided by 2 before reaching 2, i.e., log (N). Accordingly, the complexity of this DFT is O(N*log N).

The analysis above can be extended beyond the context of DFT as follows. First, a permutation is performed on incoming values in a vector to generate permutated vector. Permutations are usually O(1) operations. Then, a series of U(2) matrix multiplies is performed on the pairs of elements of the permuted vector. The U(2) values in the first column of the DFT example above are all:

$$\begin{pmatrix} 1 & 1 \\ 1 & -1 \end{pmatrix} \tag{23}$$

The U(2) matrix multiplication can be performed using other matrices as well (other than the one shown in (23)). For example, any matrix $A \in U(2) \oplus U(2) \oplus \ldots \oplus U(2)$ can be used, where $\oplus$ designates a direct sum, giving this matrix a block diagonal structure.

The combination of one permutation and one series of U(2) matrix multiplications can be regarded as one layer as described herein. The process can continue with additional layers, each of which includes one permutation and multiplications by yet another matrix in $U(2) \oplus \ldots \oplus U(2)$. In some embodiments, the layered computations can repeat for about log(N) times. In some embodiments, the number of layers can be any other values (e.g., within the available computational power).

The result of the above layered computations includes a matrix of the form:

$$A_{\log N} P_{\log N} \ldots A_2 P_2 A_1 P_1 \bar{b} \tag{24}$$

where $A_i$ represents the $i_{th}$ series of matrix multiplications and Pi represents the $i_{th}$ permutation in the $i_{th}$ layer.

Because permutations and the A matrices are all unitary, the inverse can also be readily computed. In the above layered computation, permutations are computationally free, and the computational cost is from the multiplications in the $A_i$ matrices. More specifically, the computation includes a total of 2N multiplications in each $A_i$, and there are log(N) of the $A_i$ matrices. Accordingly, the computation includes a total of 2N*log(N), or O(N*log(N)) operations, which are comparable to the complexity of OFDM.

The layered computation can be applied with any other block-U(m) matrices. For example, the $A_i$ matrix can be $A_i=U(3)\oplus \ldots \oplus U(3)$ or $A_i=U(4) \oplus \ldots \oplus U(4)$. Any other number of m can also be used. In addition, any combination of permutations and block-U(m) matrices can also be used in this layered computation allowable.

In some embodiments, the permutation and the block-U(m) transformation within one layer can be performed in a non-consecutive manner. For example, after the permutation, any other operations can be performed next before the block-U(m) transformation. In some embodiments, a permutation is not followed by another permutation because permutations are a closed subgroup of the unitary group. In some embodiments, a block-U(m) transformation is not followed by another block-U(m) transformation because they also form a closed subgroup of the unitary group. In other words, denote $B_n$ as a block-U(n) and P as permutation, then operations like $PB_{n''}PB_nPB_nB_n\bar{b}$ and $PB_{n''}B_{n'}PB_nP\bar{b}$ can be performed. In contrast, operations like $PB_nPP\bar{b}$ and $B_{n'}PB_nB_n\bar{b}$ can be redundant because two permutations or two block-U(m) transformations are consecutive here.

The layered approach to construct unitary matrices can also ensure the security of the resulting communication systems. The security of the resulting communication can depend on the size of the matrix space of fast unitary matrices compared to the full group U(N).

Figure 7:
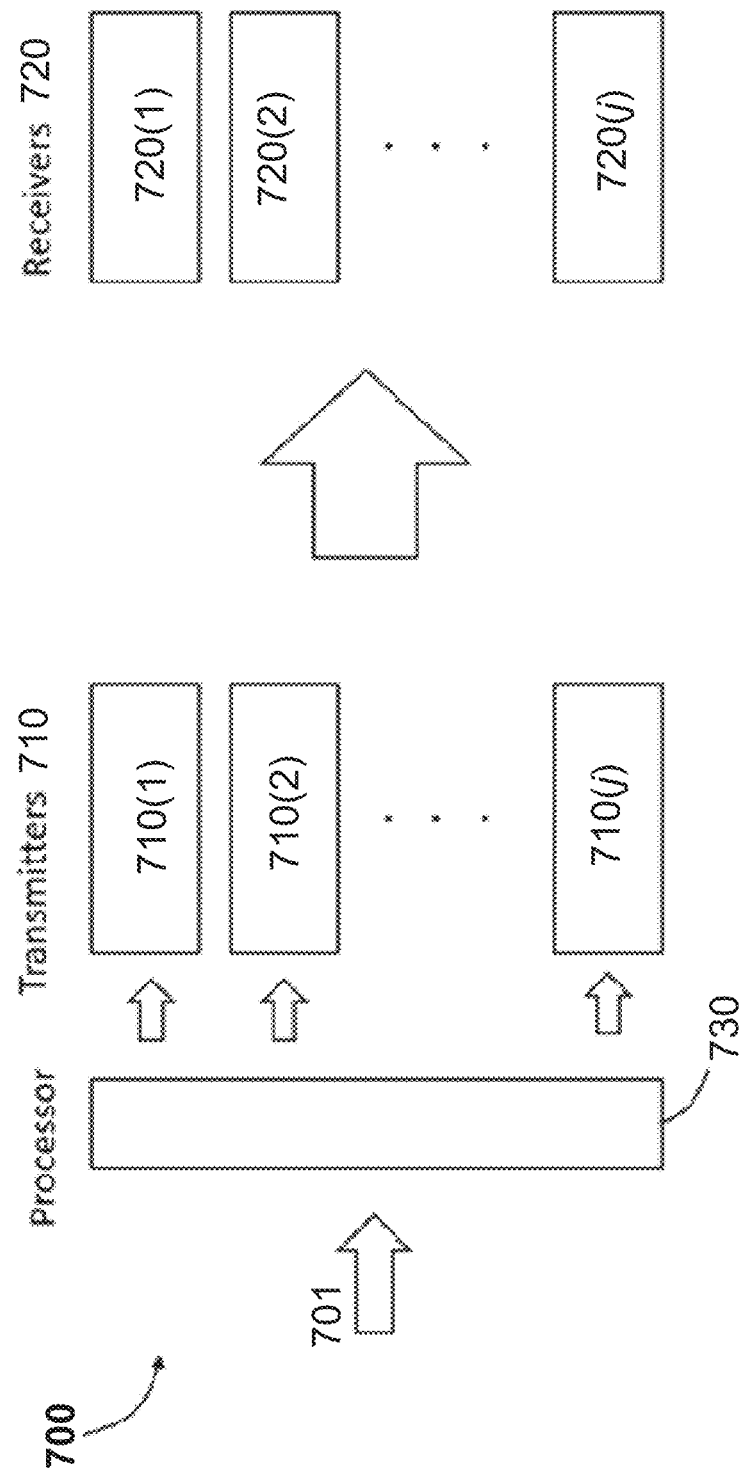
FIG. 7 is a schematic of a system for communication using layered construction of unitary matrices, according to an embodiment.

FIG. 7 is a schematic of a system for communication using layered construction of unitary matrices, according to an embodiment. The system 700 includes a plurality of signal transmitters 710(1) to 710(i) (collectively referred to as transmitters 710) and a plurality of signal receivers 720(1) to 720(j) (collectively referred to as receivers 720), where i and j are both positive integers. In some embodiments, i and j can equal. In some other embodiments, i can be different from j. In some embodiments, the transmitters 710 and the receivers 720 are configured to perform Multiple Input Multiple Output (MIMO) operations.

In some embodiments, the transmitters 710 can be substantially identical to the signal transmitter 720 illustrated in FIG. 7 and described above. In some embodiments, the receivers 720 can be substantially identical to the signal receiver 730 illustrated in FIG. 7 and described above. In some embodiments, each transmitter 710 includes an antenna and the transmitters 710 can form an antenna array. In some embodiments, each receiver includes an antenna and the receivers 720 can also form an antenna array.

The system 700 also includes a processor 730 operably coupled to the signal transmitters 710. In some embodiments, the processor 730 includes a single processor. In some embodiments, the processor 730 includes a group of processors. In some embodiments, the processor 730 can be included in one or more of the transmitters 710. In some embodiments, the processor 720 can be separate from the transmitters 710. For example, the processor 730 can be included in a compute device configured to process the incoming data 701 and then direct the transmitters 710 to transmit signals representing the incoming data 701.

The processor 730 is configured to generate a plurality of symbols based on an incoming data 701 and decompose a unitary transformation matrix of size N×N into a set of layers, where N is a positive integer. Each layer includes a permutation and at least one primitive transformation matrix of size M×M, where M is a positive integer smaller than or equal to N.

The processor 730 is also configured to encode each symbol from the plurality of symbols using at least one layer from the set of layers to produce a plurality of transformed symbols. A signal representing the plurality of transformed symbols is then sent to the plurality of transmitters 710 for transmission to the plurality of signal receivers 720. In some embodiments, each transmitter in the transmitters 710 can communicate with any receiver in the receivers 720.

In some embodiments, the processor 730 is further configured to send a signal representing one of: (1) the unitary transformation matrix, or (2) an inverse of the unitary transformation matrix, to the receivers 720, prior to transmission of the signal representing the transformed symbols to the signal receivers 720. This signal can be used to by the signal receivers 720 to recover the symbols generated from the input data 701. In some embodiments, the unitary transformation matrix can be used for symbol recovery. In some embodiments, the recovery can be achieved by using the inverse of the unitary transformation matrix.

In some embodiments, the fast unitary transformation matrix includes one of a Fourier matrix, a Walsh matrix, a Haar matrix, a slant matrix, or a Toeplitz matrix. In some embodiments, the primitive transformation matrix has a dimension (e.g., a length) with a magnitude of 2 and the set of layers includes $\log_2 N$ layers. In some embodiments, any other length can be used as described above. In some embodiments, the signal receivers 720 are configured to transmit a signal representing the plurality of transformed symbols to a target device.

As discussed above, in some embodiments, ETFs (a more general category of transformation than an orthogonal matrix) are used for symbol transformation prior to transmission. An ETF is a set of K unit vectors in N<K vectors for which every dot product has an absolute value that is equal to the "Welch Bound" The Welch Bound imposes an upper limit on the largest absolute value of pair-wise dot products of the vectors. In other words, given N dimensions, if more than N unit vectors are used, it is not possible for them all to be orthogonal to each other. An ETF (or an NETF) is a selection of N>K unit vectors in N dimensions that are as close as possible to all being mutually orthogonal. NETFs exist in all dimensions, for any number of vectors.

Performing Direct Sequence Spread Spectrum (DSSS) and/or Code Division Multiple Access (CDMA) with ETFs or NETFs can disrupt perfect orthogonality, which can in turn introduce multi-user, or inter-code, interference. ETF or NETF-based DSSS/CDMA does, however, provide a parameter that engineers can use to design a system. For example, in a system with multiple users, where users are only transmitting a certain percentage of the time, multi-user interference can be significantly reduced. Under such a circumstance, the system designer can add users without an associated compromise to performance. The system designer can also design in other forms of redundancy (e.g., forward error correction (FEC)), to make transmissions more tolerant of interference, or to reduce the impact of interference on signal integrity.

Code maps set forth herein, in some embodiments, facilitate the construction of viable spreading codes within the complex space $C^N$. Building ETFs or NETFs based on pseudo-noise (PN) codes (e.g., PN codes used in known DSSS/CDMA systems) can be challenging, however by building codes in $C^N$, as set forth herein, a large diversity of numerical methods within complex linear algebra are available for use. In some implementations, a known algorithm is used to construct an ETFs and NETFs in $C^N$, and then a code map is applied such that, while the result may still be an ETF or NETF, it also constitutes a valid set of spreading codes.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium, see for example, storage media 112 and 114 in FIG. 1) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A method, comprising:
generating, via a processor of a first compute device, a plurality of symbols;
generating a first transformation matrix, the first transformation matrix including one of an equiangular tight frame (ETF) transformation or a nearly equiangular tight frame (NETF) transformation;
generating a second transformation matrix based on the first transformation matrix, the second transformation matrix having dimensions different from dimensions of the first transformation matrix;
generating a third transformation matrix by performing a series of unitary transformations on the second transformation matrix;
producing a data vector based on the third transformation matrix and the plurality of symbols; and
sending a signal representing the data vector to a transmitter for transmission of a signal representing the data vector from the transmitter to a receiver.

2. The method of claim 1, further comprising:
sending a signal representing the third transformation matrix to a second compute device prior to transmission of the signal representing the data vector from the transmitter to the receiver, for recovery of the plurality of symbols at the receiver.

3. The method of claim 1, further comprising:
decomposing the third transformation matrix into a plurality of layers, each layer from the plurality of layers including a permutation and a primitive transformation matrix,
the data vector being based on at least one layer from the plurality of layers.

4. The method of claim 1, wherein generating the second transformation matrix includes performing a unitary transformation.

5. The method of claim 1, wherein the series of unitary transformations has an associated computational cost of O(N) arithmetic operations, where N is a positive integer.

6. The method of claim 1, wherein the receiver includes a plurality of antenna arrays, the receiver and the transmitter configured to perform Multiple Input Multiple Output (MIMO) operations.

7. The method of claim 1, wherein generating the second transformation matrix includes adding rows to the first transformation matrix.

8. A system, comprising:

a transmitter; and a processor operably coupled to the transmitter, the processor configured to:

generate a plurality of symbols;

generate a first transformation matrix, the first transformation matrix including one of an equiangular tight frame (ETF) transformation or a nearly equiangular tight frame (NETF) transformation;

generate a second transformation matrix based on the first transformation matrix, the second transformation matrix having dimensions different from dimensions of the first transformation matrix;

generate a third transformation matrix by performing a series of unitary transformations on the second transformation matrix; and produce a plurality of transformed symbols based on the third transformation matrix and the plurality of symbols.

9. The system of claim 8, wherein the at least one processor is further configured to:

decompose the third transformation matrix into a plurality of layers, each layer from the plurality of layers including a permutation and a primitive transformation matrix; and produce the plurality of transformed symbols by encoding each symbol from the plurality of symbols based on at least one layer from the plurality of layers.

10. The system of claim 8, wherein the transmitter includes a plurality of antenna arrays, the transmitter configured to perform Multiple Input Multiple Output (MIMO) operations.

11. The system of claim 8, wherein the processor is configured to generate the second transformation matrix by performing a unitary transformation.

12. The system of claim 8, wherein the series of unitary transformations on the second transformation matrix has an associated computational cost of O(N) arithmetic operations, where N is a positive integer.

13. The system of claim 8, wherein the processor is further configured to produce the plurality of transformed symbols with a computational complexity of O(N $\log_2$ N) arithmetic operations, where N is a positive integer.

14. The system of claim 8, wherein the processor is further configured to produce the second transformation matrix by adding rows to the first transformation matrix.

15. The system of claim 8, wherein the processor is further configured to:

send a signal representing the plurality of transformed symbols to the transmitter for transmission of a signal representing the plurality of transformed symbols from the transmitter to a receiver.

16. The system of claim 15, wherein the processor is further configured to:

send a signal representing the third transformation matrix to a remote compute device prior to transmission of the signal representing the plurality of transformed symbols from the transmitter to the receiver, for recovery of the plurality of symbols at the receiver.

17. A method, comprising:

receiving, via a receiver, a plurality of symbols;

producing a first plurality of transformed symbols based on a sparse transformation matrix and the plurality of symbols; and producing a second plurality of transformed symbols based on the first plurality of transformed symbols, the producing the second plurality of transformed symbols including an iterative process, each iteration of the iterative process including: (a) a permutation followed by (b) an application of at least one primitive transformation matrix; and transmitting, from a transmitter, a signal representing the second plurality of transformed symbols.

18. The method of claim 17, wherein the sparse transformation matrix is a third transformation matrix, the method further comprising:

generating a first transformation matrix, via a processor of a compute device operatively coupled to the transmitter, the first transformation matrix including one of an equiangular tight frame (ETF) transformation, or a nearly equiangular tight frame (NETF) transformation;

generating a second transformation matrix based on the first transformation matrix; and generating the third transformation matrix by performing a series of unitary transformations on the second transformation matrix.

19. The method of claim 17, wherein the transmitter includes a plurality of antenna arrays, the transmitter configured to perform Multiple Input Multiple Output (MIMO) operations.

20. The method of claim 17, wherein at least one of producing the first plurality of transformed symbols or producing the second plurality of transformed symbols has an associated computational complexity of O(N $\log_2$ N) arithmetic operations, where N is a positive integer.

* * * * *